United States Patent [19]
Hashemi

[11] Patent Number: 6,154,564
[45] Date of Patent: Nov. 28, 2000

[54] METHOD FOR SUPPLEMENTING LASER SCANNED DATA

[75] Inventor: Mohsen H. Hashemi, Irvine, Calif.

[73] Assignee: Fluor Corporation, Aliso Viejo, Calif.

[21] Appl. No.: 09/113,346

[22] Filed: Jul. 10, 1998

[51] Int. Cl.[7] ............................................ G06K 9/00
[52] U.S. Cl. ............................................ 382/154
[58] Field of Search ........................... 382/154, 305, 382/128; 707/6, 100, 4, 102, 530, 104, 500, 3, 10; 345/421, 427, 435, 357, 348, 328, 473, 342, 326, 440

[56] References Cited

U.S. PATENT DOCUMENTS

| | | | |
|---|---|---|---|
| 4,985,854 | 1/1991 | Wittenburg | 395/121 |
| 5,261,030 | 11/1993 | Brooke | 345/435 |
| 5,969,723 | 10/1999 | Schmidt | 345/428 |

*Primary Examiner*—Jose L. Couso
*Assistant Examiner*—Shawn B. Cage
*Attorney, Agent, or Firm*—Fish & Associates, LLP

[57] ABSTRACT

Methods and devices for improving the laser scanning process by supplementing data obtained by laser scanning with data obtained through photogrammetry. More specifically, both a laser scanning visual database and a photogrammetry visual database are obtained, and color values from the photogrammetry visual database are used to provide color values for the points in the laser scanning visual database.

5 Claims, 4 Drawing Sheets

METHOD FOR SUPPLEMENTING LASER SCANNED DATA

FIELD OF THE INVENTION

The field of the invention is laser scanning.

BACKGROUND OF THE INVENTION

It is often desirable to, among other things, be able to develop 3D models of existing facilities such as oil drilling platforms and petrochemical plants. Having an accurate model of the facility will often reduce the costs involved in maintaining and upgrading the facility. Developing a 3D model generally includes capturing data on the facility in its "as built" state, and then manipulating and converting the data so that it ends up as a model in a 3D CAD design system. Once in a 3D CAD system, traditional modeling, editing, and other data manipulation can be performed.

One mechanism for generating a 3D model involves laser scanning and imaging. The process of laser scanning and imaging can be broken into three phases, (1) data capture, (2) view integration, and (3) modeling. In the data capture phase, one or more scans are made from one or more positions (a set of scans from a single position is referred to as a "view"), the scans, in turn, are used to generate one or more views comprising a set of 3D coordinates. In the view integration phase, multiple views are merged to form a "world of points", or "visual database" comprising thousands of 3D coordinates. In the modeling phase, image assembly software is used to turn the "world of points" into CAD-readable geometry, such as planes, cylinders, and surfaces suitable for importation into CAD systems.

Each point in the world of points comprises a 3D (x, y, and z) coordinate, and a reflective intensity value. The 3D coordinate gives the location of a particular point and the intensity value indicates how much of the laser light was reflected back from that point. A display of the world of points is an image of the scanned object. (This is one reason why the world of points is often referred to as a "visual database". As sometimes used herein, a "visual database" is a set of data points wherein each data point comprises a set of coordinates indicating the location of the point relative to a reference point/origin.) But the image lacks the clarity of a photographic image, primarily because the only information available for each point, besides its location, is a reflective intensity value. Having only a reflective intensity value available becomes problematic during the modeling phase.

During the modeling phase, a computer is used to display the world of points. A human operator then selects individual objects visible in the world of points, and provides the additional information required to model those objects in CAD-readable geometry such as planes and cylinders. Because operators are not used to identifying objects based on their ability to reflect a single wavelength of light, identification of objects and model generation is difficult. A comparable situation exists when one looks at an infra-red photograph. Although object identification in an infra-red photograph is possible, it is not so easy as with a standard photograph utilizing light from the visual portion of the spectrum.

An alternative method of 3D model generation is the use of close range photogrammetry. Photogrammetry methods are similar to laser scanning methods in that they generally comprise a data capture, a view integration, and a modeling phase. In photogrammetry, as in laser scanning, view integration results in the creation of a visual database. The visual database created through photogrammetry, however, consists of a set of points with each point having a 3D coordinate and a color value associated with it. Because of the inclusion of color values, displays based on the data in a visual database obtained via photogrammetry tend to be more intuitive than displays of data in a visual database obtained via laser scanning. As a result, the modeling phase of a photogrammetry based method tends to be easier than the same phase of a laser scanning method.

Photogrammetry provides an additional benefit over laser scanning in that the coordinates obtained via laser scanning are "relative", that is, they provide position data only relative to the other points in the visual database. In contrast, coordinates obtained by photogrammetry are "absolute". They provide position data relative to a known outside reference so that the locations of the points in the "real world" are determinable. Moreover, positioning of points using photogrammetry tends to be more accurate (accuracy approximating plus or minus 3 mm) than when using laser scanning (accuracy approximating plus or minus 5 mm). Laser scanning, however, can generally be accomplished in a fraction of the time it takes to perform photogrammetry. Photogrammetry, because of the need to take and develop a large number of photographs, tends to be very time consuming.

In many instances, the speed of laser scanning helps to overcome many of its deficiencies. However, when laser scanning is used to generate a visual database from which 3D models are to be made, the time savings in generating the visual database is insufficient to overcome the increased difficulties posed by limited data. Thus there is a continuing need to improve laser scanning methods to assist in the generation of 3D models based on data obtained through laser scanning.

SUMMARY OF THE INVENTION

The present invention is directed to methods and devices for improving the laser scanning process by supplementing data obtained by laser scanning with data obtained through photogrammetry. More specifically, both a laser scanning visual database and a photogrammetry visual database are obtained, and color values from the photogrammetry visual database are used to provide color values for the points in the laser scanning visual database.

Combining data from laser scanning and photogrammetry is an improvement on laser scanning alone because combining data improves the modeling process by making laser scanned data more visually intuitive, and provides the ability to use a "true" rather than a "relative" coordinate system. Combining data is an improvement on photogrammetry alone because it greatly speeds up the modeling process by reducing the number of photographs needed to be taken.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
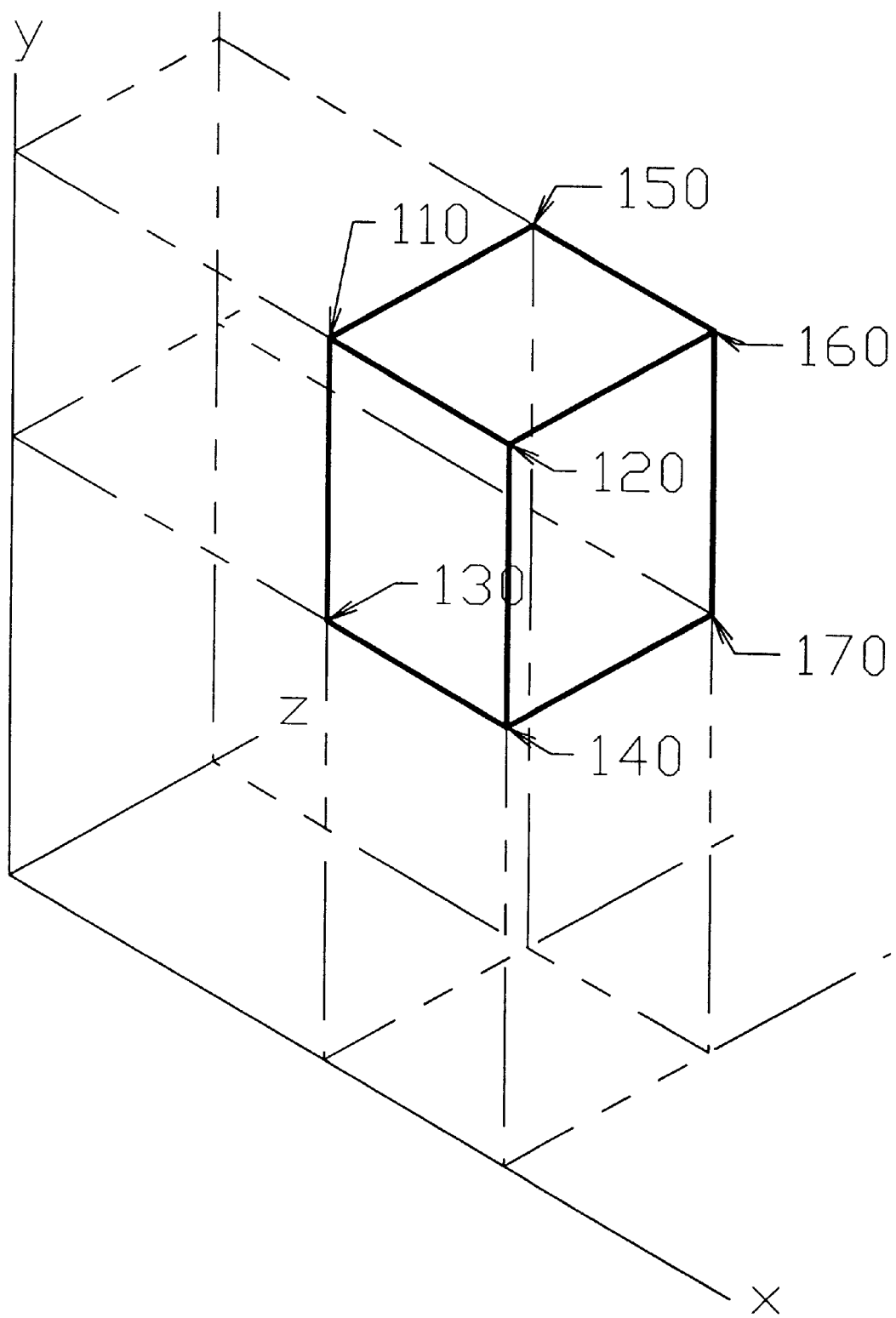
FIG. 1 is a perspective view of a cube.

Referring first to FIG. 1, the surface of a cube 100 comprises visible vertices 110, 120, 130, 140, 150, 160, and 170. Assuming that it is desirable to obtain the location and color of vertex 110 for modeling purposes, the location could be determined using laser scanning, and the location and color could be determined using photogrammetry. Once a visual database has been created using each method, the data contained in the photogrammetry visual database (sometimes hereinafter P-DB) could be combined with the laser scanning visual database (sometimes hereinafter LS-DB) to create a resultant visual database (sometimes hereinafter R-DB).

Figure 2:
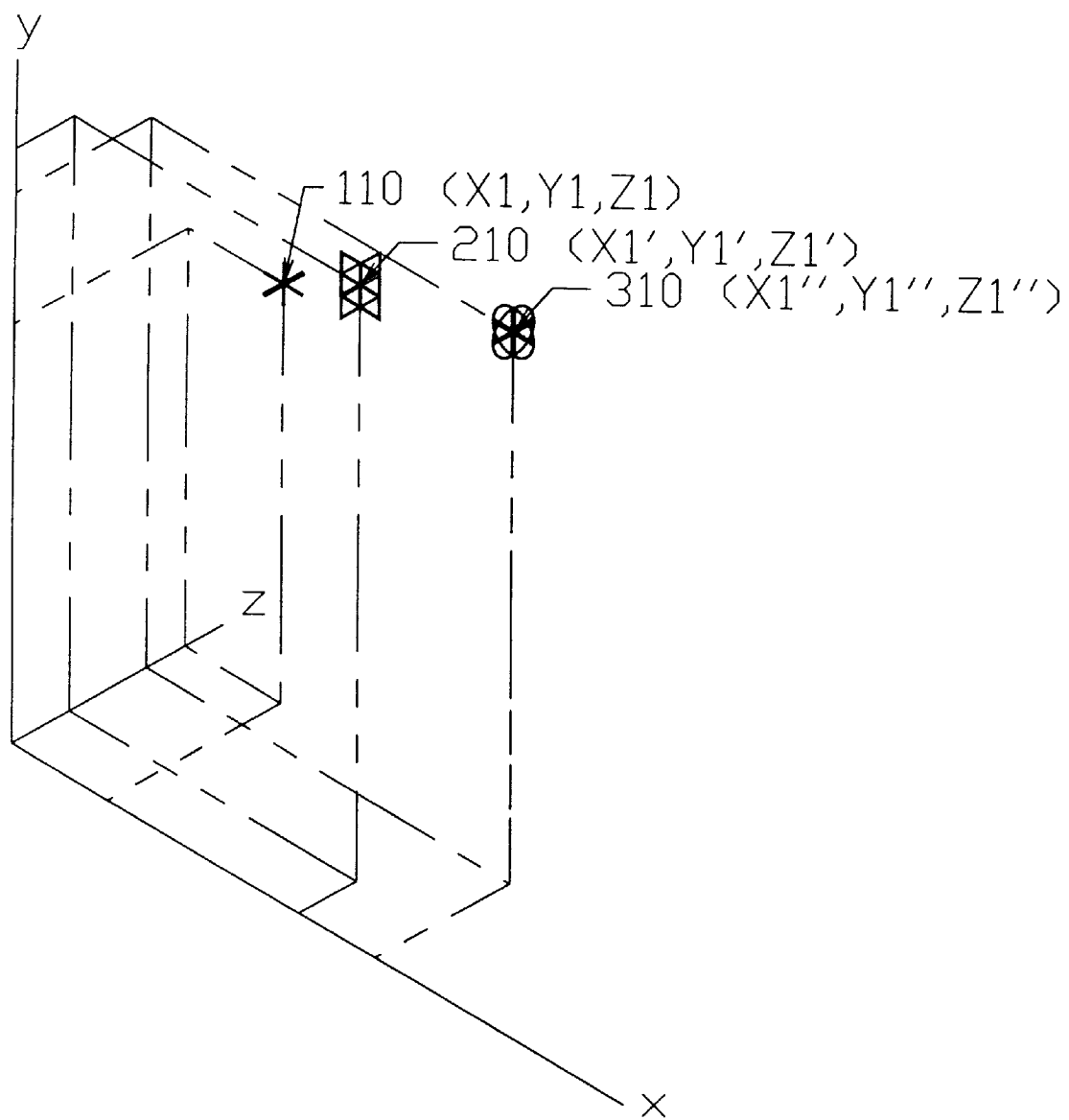
FIG. 2 is a plot of three points where one point represents the vertex of a cube and the other two points represent data points obtained by laser scanning and photogrammetry.

Referring to FIG. 2 and Table 1A, laser scanning the vertex 110 of cube 100 of FIG. 1 might result in a visual database or set of points with the point 210 corresponding to vertex 110 and having coordinates X', Y', and Z'.

TABLE 1A

| Point | X  | Y  | Z  | Color   |
|-------|----|----|----|---------|
| 210   | X' | Y' | Z' | Unknown |

Referring to FIG. 2 and Table 1B, the use of photogrammetry to obtain data on the vertex 110 of cube 100 of FIG. 1 might result in a visual database, with the point 310 corresponding to vertex 110, and having coordinates X'', Y'', and Z''. Additionally, point 310 might have the color red associated with it in the photogrammetry visual database.

TABLE 1B

| Point | X   | Y   | Z   | Color |
|-------|-----|-----|-----|-------|
| 310   | X'' | Y'' | Z'' | Red   |

Having obtained two visual databases, the data of the LS-DB shown in Table 1A could be supplemented with the color information contained in the P-DB shown in Table 1B, and resulting in the R-DB shown in Table 1C.

TABLE 1C

| Point | X  | Y  | Z  | Color |
|-------|----|----|----|-------|
| 210   | X' | Y' | Z' | Red   |

For the simplistic case shown, where data on only a single point of an object is obtained, there is no difficulty in finding the point in the P-DB which corresponds to the point in the LS-DB. However, in practice, the visual databases will contain thousands of points, and determining which points in the P-DB correspond with points in the LS-DB, or visa versa, will not be so easy.

Figure 3:
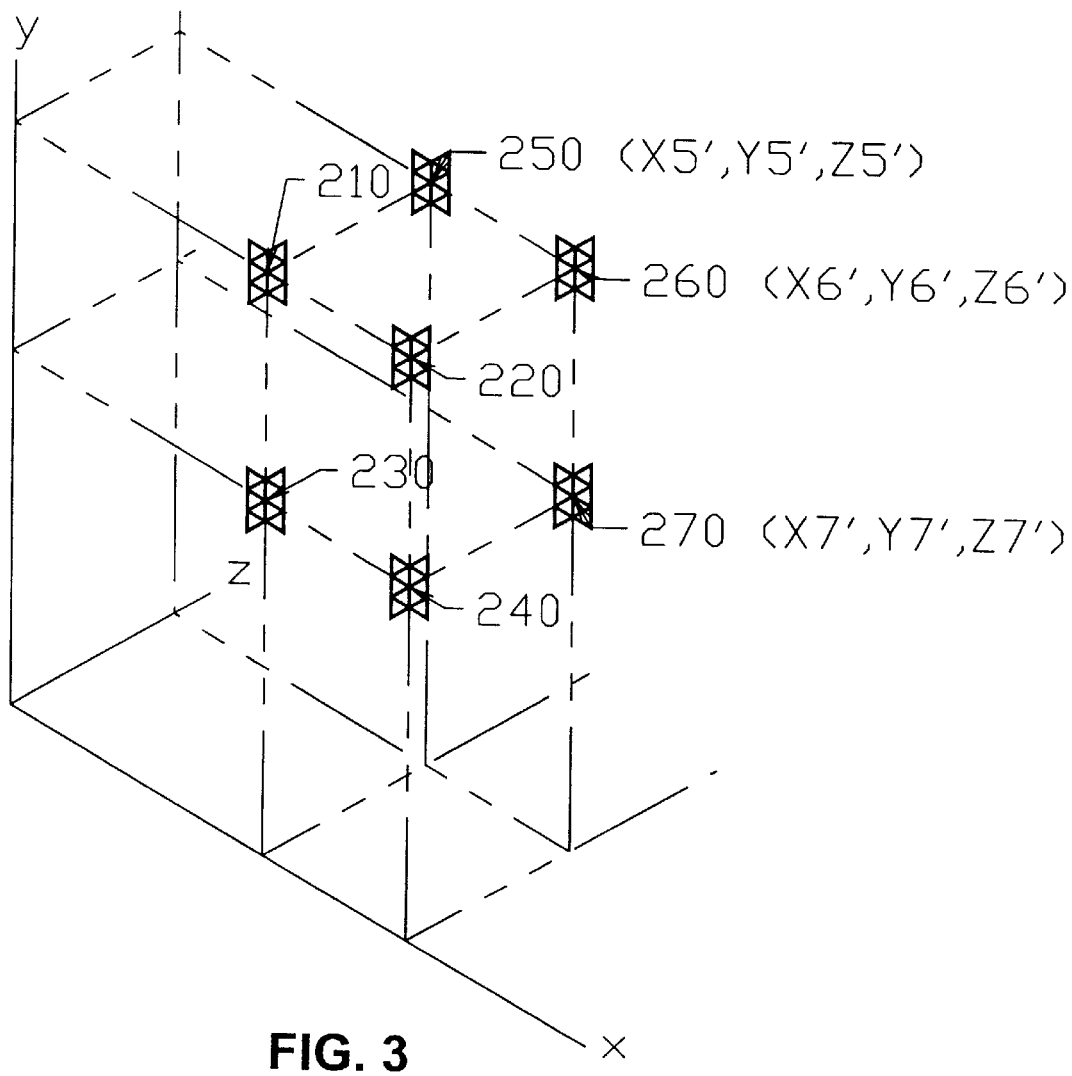
FIG. 3 is a plot of the points in a visual database obtained by using laser scanning to obtain data on the vertices of the cube of FIG. 1.

Referring to FIG. 3 and Table 2A, laser scanning the cube 100 of FIG. 1 might result in the LS-DB shown with point 210 corresponding to vertex 110, point 220 corresponding to vertex 120, point 230 corresponding to vertex 130, point 240 corresponding to vertex 140, point 250 corresponding to vortex 150, point 260 corresponding to vertex 160, and point 270 corresponding to vertex 170.

TABLE 2A

| Point | X   | Y   | Z   | Color   |
|-------|-----|-----|-----|---------|
| 210   | X1' | Y1' | Z1' | Unknown |
| 220   | X2' | Y2' | Z2' | Unknown |
| 230   | X3' | Y3' | Z3' | Unknown |
| 240   | X4' | Y4' | Z4' | Unknown |
| 250   | X5' | Y5' | Z5' | Unknown |
| 260   | X6' | Y6' | Z6' | Unknown |
| 270   | X7' | Y7' | Z7' | Unknown |

Figure 4:
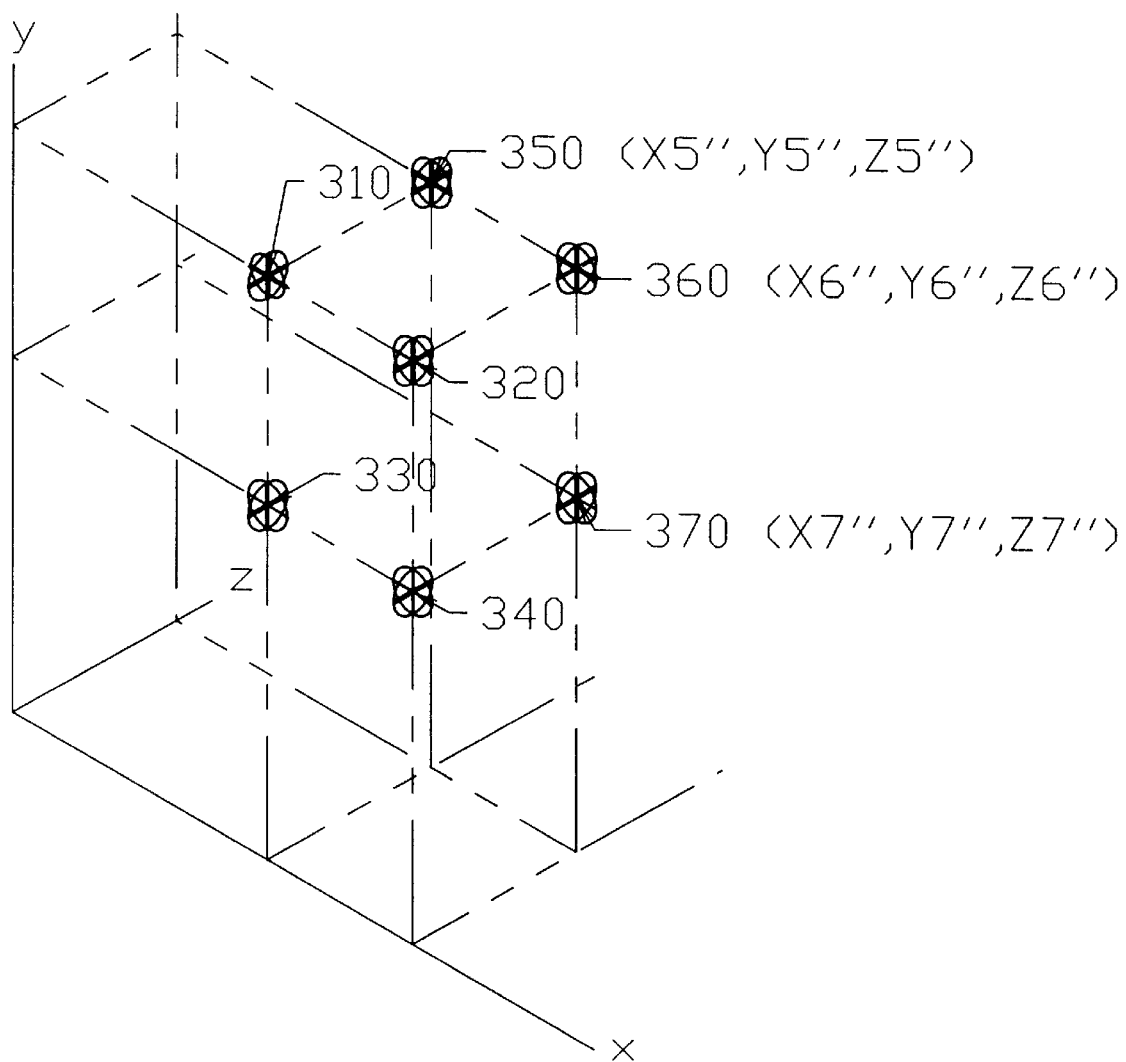
FIG. 4 is a plot of the points in a visual database obtained by photogrammetry to obtain data on the vertices of the cube of FIG. 1.

Referring to FIG. 4 and Table 2B, the use of photogrammetry to obtain data on the vertices of the cube of FIG. 1 might result in the P-DB shown with point 310 corresponding to vertex 110, point 330 corresponding to vertex 130, point 340 corresponding to vertex 140, point 350 corresponding to vertex 150, point 360 corresponding to vertex 160, and point 370 corresponding to vertex 170.

TABLE 2B

| Point | X   | Y   | Z   | Color  |
|-------|-----|-----|-----|--------|
| 310   | X1' | Y1' | Z1' | Red    |
| 320   | X2' | Y2' | Z2' | Yellow |
| 330   | X3' | Y3' | Z3' | Blue   |
| 340   | X4' | Y4' | Z4' | Green  |
| 350   | X5' | Y5' | Z5' | Orange |
| 360   | X6' | Y6' | Z6' | Violet |
| 370   | X7' | Y7' | Z7' | Red    |

Having obtained two visual databases, the data of the LS-DB shown in Table 2A could be supplemented, in a manner to be described, with the color information contained in the P-DB shown in Table 2B and resulting in the database shown in Table 2C.

TABLE 2C

| Point | X   | Y   | Z   | Color  |
|-------|-----|-----|-----|--------|
| 210   | X1' | Y1' | Z1' | Red    |
| 220   | X2' | Y2' | Z2' | Yellow |
| 230   | X3' | Y3' | Z3' | Blue   |
| 240   | X4' | Y4' | Z4' | Green  |
| 250   | X5' | Y5' | Z5' | Orange |
| 260   | X6' | Y6' | Z6' | Violet |
| 270   | X7' | Y7' | Z7' | Red    |

To this end, color information needs to be derived for the points of the LS-DB. One method of doing this is to scan the P-DB for a point having x, y, and z coordinates identical to a particular point in the LS-DB. Having identified a point in the P-DB co-located with a point in the LS-DB, the color of a point in the P-DB could be associated with the point in the LS-DB. If more than a single point in the P-DB is co-located with a point in the LS-DB, and if the color values for the co-located points in the P-DB are not identical, the color information could be combined to obtain a value for the point in the LS-DB. Combining color information may be accomplished in many different ways, such as by randomly choosing a color from a single point, averaging color information for all the points, or using some other computational basis to derive color information to be associated with the point in the LS-DB from the co-located points in the P-DB.

Comparison of locations of points in the LS-DB and P-DB may be accomplished by converting the coordinates of each visual database to be relative to a common reference point/origin. One method of doing this is to locate one or more common targets in both the LS-DB and the P-DB and to convert the coordinates of both databases relative to those targets. Location of common targets may be accomplished manually by an operator selecting common points from each database, by utilizing specialized targets having unique features which can automatically be detected in the data of each database, or by automatically comparing some or all of the data points in the two databases to obtain a measure of the differences between them, and to adjust the coordinates of one or both databases such that the measure of the differences is minimized. Finding points in the P-DB with identical locations as points in the LS-DB will probably be a relatively infrequent occurrence, and other methods must generally be utilized for associating points in the P-DB with points in the LS-DB.

A preferred method for finding corresponding points would be to scan the P-DB for all the points located within a sphere centered on the point in the LS-DB, and having a fixed radius. If no points in the P-DB fit within such a sphere, the radius of the sphere might be increased and the scan repeated. Or, if information has already been found for neighboring points in the LS-DB, the information from the neighboring points in the LS-DB might be used.

Once a set of corresponding points has been found, various techniques for deriving one color value from the set of corresponding points could be utilized. As previously described for co-located points, combining color information might be accomplished by randomly choosing a color from a single point, averaging color information for all the points, or using some other computational basis to derive color information to be associated with the point in the LS-DB from the co-located points in the P-DB.

In addition to supplementing a LS-DB with data from a P-DB, it is also contemplated to supplement a P-DB from a LS-DB, or to supplement any visual database obtained through one method with data from a visual database obtained through another method. Thus, one might supplement a LS-DB with data obtained from infrared photographs, sonar image data, radar image data, or some other method. Similarly, one might supplement other data such as sonar or radar image data with data obtained through laser scanning. It should be noted that "supplementing" as used herein contemplates combining data in any manner such that, given database A, and database B, the result of supplementing might result in a modified database A, a modified database B, an entirely new database C, or some other combination of new and/or modified databases.

Thus, specific embodiments and applications of supplementing laser scanned data have been disclosed. It should be apparent, however, to those skilled in the art that many more modifications besides those already described are possible without departing from the inventive concepts herein. For example, alternative techniques for finding which data points in the photogrammetry visual database correspond to a particular point in the laser scanning visual database might be use. Similarly, it is possible to utilize other techniques for deriving a color value for a particular point in a laser scanning visual database from the color values of the corresponding points in the photogrammetry visual database. The inventive subject matter, therefore, is not to be restricted except in the spirit of the appended claims.

What is claimed is:

1. A method for supplementing data in a visual database comprising:

creating a first visual database and a second visual database;

supplementing the first visual database with the data from the second visual database by selecting a set of points from the first visual database, finding corresponding points in the second visual database for each of the points in the selected set of points, and deriving a color value for each of the points in the selected set of points from the color values of the corresponding points;

wherein finding corresponding points further comprises converting the coordinate values for the points in at least one of the visual databases so that the coordinate values in both visual databases are specified relative to a common origin; calculating a distance between the points in the selected set of points and the points in the second visual database; and comparing the calculated distance with a threshold value to determine whether a particular point in the second visual database corresponds to a particular point in the selected set of points.

2. The method of claim 1 wherein the step of deriving a color value further comprises:

selecting the closest corresponding point from the corresponding points for each of the points in the selected set of points; and associating the color value of the closest corresponding point to each point in the selected set of points.

3. The method of claim 1 wherein the step deriving a color value further comprises averaging the color values of all the corresponding points.

4. The method of claim 1 wherein supplementing the first visual database with data from the second visual database is done electronically.

5. The method of any one of claims 1–4 wherein the first visual database is obtained by laser scanning, and the second visual database is obtained through photogrammetry.

* * * * *